United States Patent
Stryker et al.

[11] Patent Number: 6,033,004
[45] Date of Patent: Mar. 7, 2000

[54] CONSOLE WITH COIN RETENTION MECHANISM

[75] Inventors: Andrea L. Stryker, Lake Orion; L. John Ozark, Grosse Pointe Woods, both of Mich.

[73] Assignee: Chrysler Corporation, Auburn Hills, Mich.

[21] Appl. No.: 09/092,277

[22] Filed: Jun. 5, 1998

[51] Int. Cl.[7] .................................................. G07D 1/00
[52] U.S. Cl. ........................ 296/37.8; 224/539; 453/63; 206/0.81
[58] Field of Search ...................... 296/37.8; 229/539, 229/483; 453/63; 206/0.81

[56] References Cited

U.S. PATENT DOCUMENTS

| | | |
|---|---|---|
| 515,525 | 2/1894 | Jones . |
| 2,467,762 | 4/1949 | Marshalka .................... 296/37.8 X |
| 2,497,365 | 2/1950 | McMurtry ................................ 211/89 |
| 2,653,703 | 9/1953 | Krauss ..................................... 206/34 |
| 2,800,360 | 7/1957 | Jenkins . |
| 3,080,963 | 3/1963 | Rothgart ................................ 206/84 |
| 3,138,244 | 6/1964 | White ..................................... 206/81 |
| 3,245,522 | 4/1966 | Pearson ................................. 206/81 |
| 3,329,277 | 7/1967 | Gaudino ................................. 211/13 |
| 4,537,439 | 8/1985 | Otani ..................................... 296/37.9 |
| 4,568,117 | 2/1986 | McElfish et al. ..................... 296/37.8 |
| 4,708,386 | 11/1987 | Moore et al. ......................... 296/37.8 |
| 4,836,365 | 6/1989 | Hall ....................................... 206/83 |
| 4,915,273 | 4/1990 | Allen . |
| 5,024,411 | 6/1991 | Elwell ................................. 248/311.2 |
| 5,096,152 | 3/1992 | Christiansen et al. ............ 248/311.2 |
| 5,267,893 | 12/1993 | Mangigian ............................ 453/54 |
| 5,449,105 | 9/1995 | Schiff et al. ......................... 224/281 |
| 5,855,308 | 1/1999 | Ziegler et al. . |

*Primary Examiner*—Joseph D. Pape
*Attorney, Agent, or Firm*—Mark P. Calcaterra

[57] ABSTRACT

A console particularly for a motor vehicle includes several coin receiving recesses. Each recess is formed to include a generally arcuate lower surface and first and second spaced apart side surfaces. One of the first and second spaced apart side surface is formed to integrally include a coin retention member. The coin retention member is adapted to engage a coin and bias the coin against the opposite side to thereby prevent rattling during vehicle use. In the preferred embodiment, the recesses, including their associated coin retention members, are integrally formed with the console through an injection molded process. One suitable material for the console is polypropylene.

20 Claims, 2 Drawing Sheets

CONSOLE WITH COIN RETENTION MECHANISM

BACKGROUND OF THE INVENTION

The present invention generally relates to a molded plastic console for use in a motor vehicle. More particularly, the present invention relates to an improved molded plastic console for a motor vehicle with a coin retention feature.

It is generally known to provide a motor vehicle with a console for securely retaining various items during travel. For example, many motor vehicle manufacturers provide a console with one or more areas adapted for supporting a beverage container. These areas are intended to secure a beverage container which is otherwise not sufficiently stable to withstand jostling encountered during normal vehicle travel due to an upright and cylindrical construction.

It is also desirable to securely and conveniently retain change within a motor vehicle for the payment of road tolls, parking fees, and other operator incurred expenses. U.S. Pat. No. 5,267,893 discloses a vehicle ashtray incorporating a coin retaining capacity. It is also known to incorporate certain coin holders within vehicle consoles.

In conventional holders, coins are inserted into cylindrical cavities having a diameter slightly greater than that of the coins they are designed to hold. While such arrangements may have become popular, they are associated with disadvantages. In this regard, if the coins are deposited into a cylindrical cavity having a larger diameter, the smaller coins have a tendency to rattle. In addition, recognizing that the modern marketplace is global, it can be appreciated that the coins of various nations have largely variable diameters and thicknesses that are often difficult to retain with conventional holders. As such, the need exists for the development of a console for a motor vehicle which has a coin retention mechanism adapted to accommodate significant variation in coin diameters without allowing the retained coins to rattle.

SUMMARY OF THE INVENTION

In view of the foregoing, it is a general object of the present invention to provide a console adjacent to the driver for a motor vehicle having a coin holding portion.

It is a more particular object of the present invention to provide the coin retention mechanism capable of accepting coins of any diameter and preventing rattle of those coins due to vibrations from a motor vehicle. The mechanism will retain various coin sizes, including domestic (one cent, five cents, ten cents, twenty five cents) as well as foreign coins without permitting the coins to rattle.

It is a further object of the present invention to provide a coin retention mechanism that may be integrally formed into the injection molded console for a motor vehicle which does not require any additional components.

The coin retention mechanism of the present invention includes one or more slots each having a resiliently deflectable member. The material to be used in defining these slots is preferably a polypropylene, which has favorable life cycle properties as well as a sufficient degree of elasticity. The slots and associated deflectable members can also be arranged in numerous designs and can retain coins in virtually any orientation, including upside down.

In one form, the present invention provides a console for a motor vehicle adapted to receive a coin. The console includes an upper surface having at least one recess adapted to receive the coin. The recess is preferably defined by a generally arcuate lower surface and a first side surface. The console further includes a coin retention member disposed within the recess. The coin retention member is adapted to bias the coin against the first side surface.

BRIEF DESCRIPTION OF THE DRAWINGS

Further objects and advantages of the present invention will become apparent to those skilled in the art from reading the following descriptions and the accompanying drawings in which.

DETAILED DESCRIPTION OF THE PREFERRED EMBODIMENT

Figure 1:
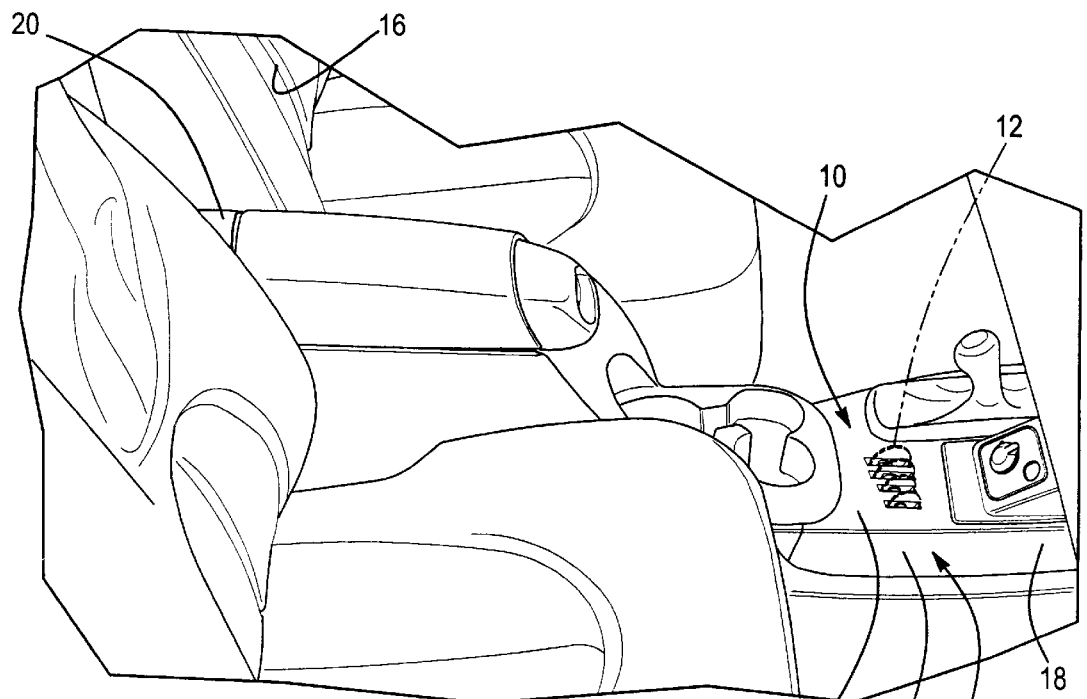
FIG. 1 is a view of an environmental view of a portion of a motor vehicle interior incorporating an arrangement for retaining coins constructed in accordance with the teachings of the preferred embodiment of the present invention.

With initial reference to the environmental view of FIG. 1, an arrangement for retaining coins constructed in accordance with the teachings of a preferred embodiment of the present invention is generally identified at reference numeral 10. The arrangement 10 is shown operatively associated with a plurality of coins 12 (shown in phantom) and formed as an integral portion of a center console 14 of a motor vehicle 16. It will become apparent to those skilled in the art that the arrangement 10 of the present invention may alternatively be formed in the dashboard, the glove box door, or virtually any other injection molded portion of the vehicle interior.

While the present invention is, primarily directed to the arrangement for retaining coins 10, a brief understanding of the exemplary console 14 shown throughout the drawings is warranted. With the exception of the arrangement for retaining coins 10, the console is conventional in construction. The console 14 is generally formed to include a top surface 17 having a fore end 18 and an aft end 20. The console 14 further has a pair of side surfaces 22. In the exemplary embodiment, the arrangement for retaining coins 10 is illustrated formed toward the fore end 18 of the console 14.

With continued reference to the environmental view of FIG. 1 and additional reference to FIGS. 2–5, the arrangement 10 of the present invention will be further described. The arrangement 10 is shown to include a plurality of coin receiving recesses or slots 24. Each of the slots 24 is preferably illustrated to receive a single coin 12. However, it will become apparent to those skilled in the art, that the slots 24 may alternatively be sized to receive two or more coins 12. In the exemplary embodiment, the slots 24 of the arrangement 10 are four (4) in number. Certain applications may require more or less slots 24.

Each of the slots 24 is shown to be defined by a generally arcuate lower surface 26 and first and second sides 28 and 30. In the exemplary embodiment illustrated, the first and second sides 28 and 30 are oriented vertically and parallel to one another. The second side 30 is formed to include a deflectable member or coin retention member 32 specifically adapted for biasing a coin 12 against the first side 28. The retention member 32 is illustrated to include an upper camming surface 36 which has a convex curvature. This convex curvature allows entry of the coin 12 into the slot 24 and resiliently forces the coin 12 against the first side 28.

Figure 2:
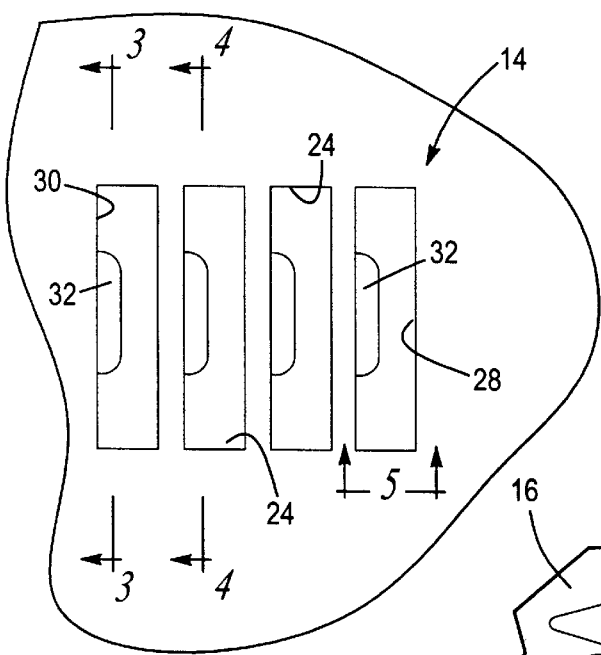
FIG. 2 is an enlarged top view of a portion of the console of FIG. 1, illustrating in further detail the arrangement for retaining coins of the present invention.
Figure 3:
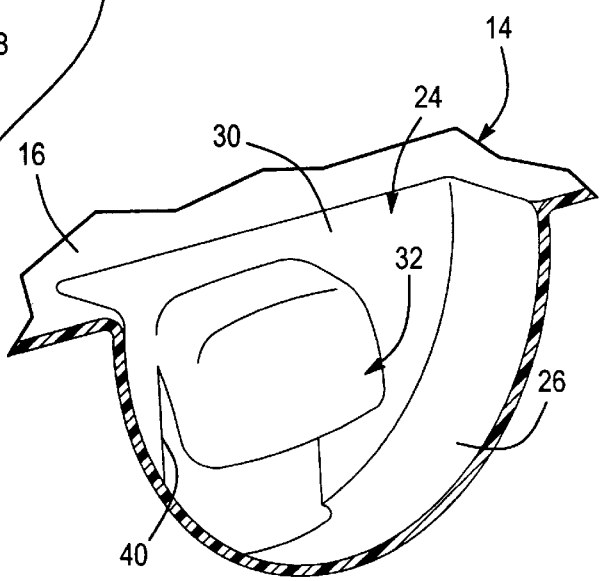
FIG. 3 is a cross-sectional view taken along the line 3—3 of FIG. 2.

As shown most clearly in FIG. 2, each recess 24 is shown to further include an access hole 40 in the lower arcuate surface 26 and second side 30. The access hole 40 facilitates production of the coin retention member 32 during the manufacturing processes. In this regard, the access hole 40 allows the coin holding member 32 to be produced as an integral part of the console 14. The access hole 40 also provides for a passage for debris or liquid which may otherwise become inadvertently entrapped within the recess 24.

Figure 4:
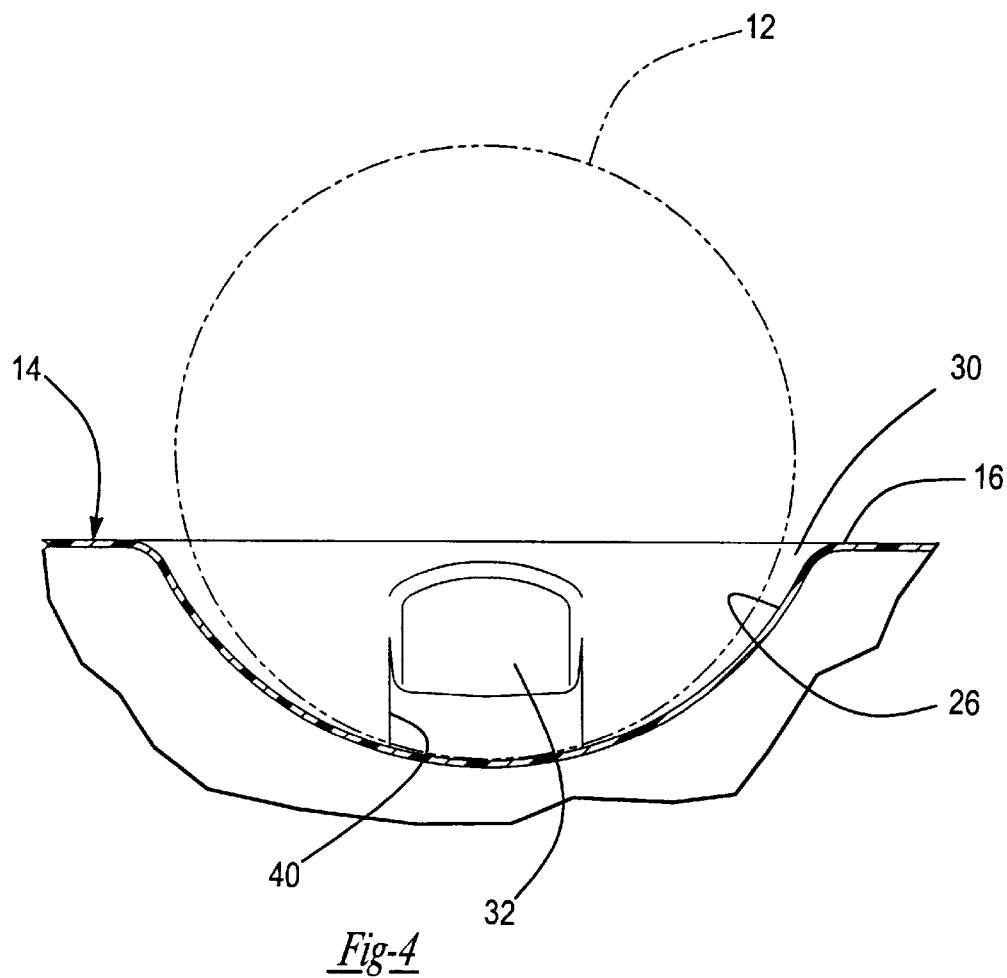
FIG. 4 is a cross-sectional view taken along the line 4—4 of FIG. 2.
Figure 5:
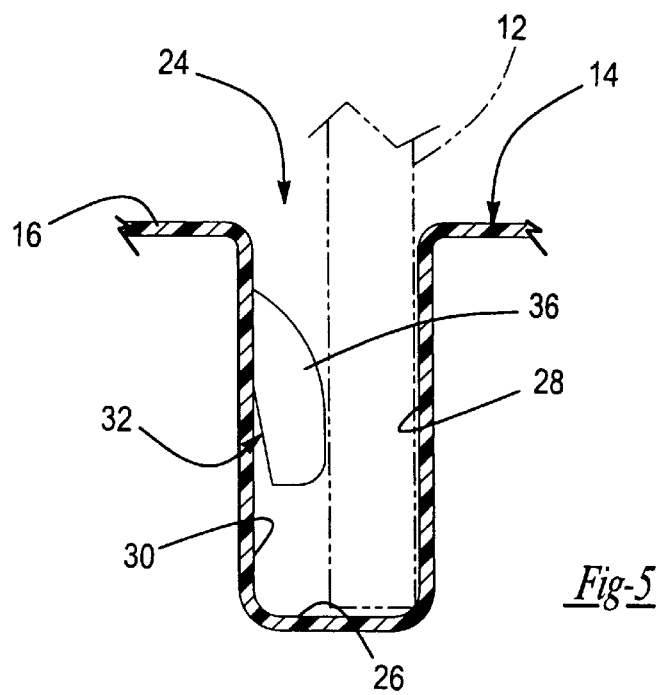
FIG. 5 is a cross-sectional view taken along the line 5—5 of FIG. 3.

As best seen in the cross-sectional view of FIG. 4, the retention member 32 is positioned within the recess 24 such that when a coin 12 is placed within a slot 24 of the apparatus 10, an interference fit is formed between the retention member 32 and the first side 28. The retention member 32 acts as a deformed cantilevered beam and applies force to one side of the coin 12, thereby pressing the coin 12 into contact with the first side 28. This action securely holds the coin 12 in place and thus prevents rattling.

In the preferred embodiment, the arrangement 10 of the present is formed through an injection molding process. Further preferably, the console 14 and the recesses 24, including the retention members 32, are unitarily constructed of polypropelene. Polypropelene has proven to exhibit strength and resiliency characteristics suitable for the present application. However, it will be appreciated by those skilled in the art, that alternative materials may be incorporated.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. For example, the slots 24 of the arrangement 10 can be placed on either on the fore or aft end of the console 14. Similarly, the position of the coin holding slots 24 can be on the lateral sides 22 of the console 14. In addition, many other modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments following within the description of the appended claims.

What is claimed is:

1. An apparatus for retaining a coin, the apparatus comprising:
   a main body portion including a coin receiving recess, said coin receiving recess having an open upper end for receiving the coin, said coin receiving recess defined by a lower surface and first and second lateral side surfaces; and
   a retention member disposed within said coin receiving recess, said retention member being resiliently deflectable and adapted to bias the coin against said first lateral side surface, said retention member being integrally formed with said second lateral side.

2. The apparatus for retaining a coin of claim 1, wherein said lower surface is concavely curved.

3. The apparatus for retaining a coin of claim 1, wherein said retention member comprises a cantilevered finger extending from said second lateral side surface which is substantially parallel to said first lateral side surface.

4. The apparatus for retaining a coin of claim 3, wherein said main body portion and said retention member are injection molded of plastic.

5. The apparatus for retaining a coin of claim 4, wherein said main body portion and said retention member are constructed of polypropylene.

6. The apparatus for retaining a coin of claim 1, wherein said retention member includes a convexly curved upper surface.

7. The apparatus for retaining a coin of claim 3, further comprising a first opening adjacent said retention member.

8. An apparatus for retaining a plurality of coins, the apparatus comprising:
   a main body portion including a plurality of coin retaining recesses, each of said coin retaining recesses having an open upper end and defined by a lower surface and first and second lateral side surfaces and adapted to receive a single coin of the plurality of coins; and
   a retention member disposed within each of said coin receiving recesses, each retention member being resiliently deflectable in response to insertion of said single coin into an associated coin retaining recess in a direction substantially parallel to said first and second sides, said retention member adapted to bias a coin against said first lateral side surface, said retention member being integrally formed with said second lateral side and including a convexly curved upper surface.

9. The apparatus for retaining a plurality of coins of claim 8, wherein said lower surface is concavely curved.

10. The apparatus for retaining a plurality of coins of claim 8, said retention member comprises a cantilevered finger extending from said second lateral side surface which is substantially parallel to said first lateral side surface.

11. The apparatus for retaining a plurality of coins of claim 10, wherein said main body portion and said retention member are injection molded of plastic.

12. The apparatus for retaining a plurality of coins of claim 11, wherein said main body portion and said retention member are constructed of polypropelene.

13. The apparatus for retaining a plurality of coins of claim 8, wherein said retention member includes a convexly curved upper surface.

14. The apparatus for retaining a plurality of coins of claim 9, further comprising a first opening adjacent said retention member.

15. A console for a motor vehicle adapted to receive a coin, the console comprising:
   an upper surface including a coin receiving recess adapted to partially receive the coin such that the coin substantially extends from the recess above the upper surface, said recess having an open upper end for receiving the coin and being defined by a lower surface and first and second lateral side surfaces, said lower surface configured to matingly receive a portion of a rounded edge of the coin; and
   a retention member disposed within said coin receiving recess, said retention member being resiliently deflectable in response to insertion of the coin into the recess in a direction substantially parallel to said first and second lateral side surfaces and adapted to bias the coin against said first lateral side surface, said retention member being integrally formed with said second lateral side surface and including a convexly curved upper surface.

16. The apparatus for retaining a coin of claim 15, wherein said lower surface is generally concavely curved.

17. The apparatus for retaining a coin of claim 16, wherein said retention member comprises a cantilevered finger extending from said second lateral side surface which is substantially parallel to said first lateral side surface.

18. The apparatus for retaining a coin of claim 17, wherein said main body portion and said retention member are injection molded of plastic.

19. The apparatus for retaining a coin of claim 18, wherein said main body portion and said retention member are constructed of polypropylene.

20. The apparatus for retaining a coin of claim 16, wherein said retention member includes a convexly curved upper surface.

* * * * *